(12) United States Patent
Kataoka et al.

(10) Patent No.: US 8,267,357 B2
(45) Date of Patent: Sep. 18, 2012

(54) WATERPROOF CABLE GUIDE DEVICE FOR RAILWAY VEHICLE

(75) Inventors: Shin Kataoka, Kobe (JP); Kunihiko Takagi, Akashi (JP); Yutaka Kitagawa, Kobe (JP); Kazuya Morita, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/030,520

(22) Filed: Feb. 18, 2011

(65) Prior Publication Data

US 2011/0253846 A1    Oct. 20, 2011

(30) Foreign Application Priority Data

Feb. 22, 2010   (JP) ................... 2010-035628

(51) Int. Cl.
    *F16L 3/22*    (2006.01)
(52) U.S. Cl. .......... 248/68.1; 248/72; 248/73; 211/60.1; 174/135
(58) Field of Classification Search ............... 248/68.1, 248/72, 73; 211/60.1; 174/135
    See application file for complete search history.

(56) References Cited

U.S. PATENT DOCUMENTS

| | | | | | |
|---|---|---|---|---|---|
| 2,338,660 | A | * | 1/1944 | Morehouse | 248/68.1 |
| 2,354,919 | A | * | 8/1944 | Lockwood | 248/68.1 |
| 2,355,742 | A | * | 8/1944 | Morehouse | 248/68.1 |
| 2,361,943 | A | * | 11/1944 | Issoglio et al. | 174/135 |
| 2,362,124 | A | * | 11/1944 | Ellinwood | 174/135 |
| 2,404,531 | A | * | 7/1946 | Robertson | 248/68.1 |
| 2,417,260 | A | * | 3/1947 | Morehouse | 174/135 |
| 2,518,289 | A | * | 8/1950 | Cox | 211/60.1 |
| 3,582,029 | A | * | 6/1971 | Moesta | 248/68.1 |
| 3,592,427 | A | * | 7/1971 | Misuraca | 248/68.1 |
| 3,682,422 | A | * | 8/1972 | Evans | 248/68.1 |
| 4,971,271 | A | * | 11/1990 | Sularz | 248/68.1 |
| 5,098,047 | A | * | 3/1992 | Plumley | 248/68.1 |
| 2004/0124320 | A1 | * | 7/2004 | Vantouroux | 248/68.1 |

FOREIGN PATENT DOCUMENTS

| | | |
|---|---|---|
| JP | Y2-58-21297 | 5/1983 |
| JP | U-62-84982 | 5/1987 |
| JP | A-2002-238142 | 8/2002 |

* cited by examiner

*Primary Examiner* — Anita M King
(74) *Attorney, Agent, or Firm* — Oliff & Berridge PLC

(57) ABSTRACT

A waterproof cable guide device for a railway vehicle, comprises an elastic member of a substantially rectangular prism shape, which has a plurality of through-holes into which the plurality of electric cables are inserted, respectively, the plurality of through-holes penetrating the elastic member in a forward and backward direction, the elastic member being divided in positions of the through-holes or having slits extending from an outer peripheral surface of the elastic member to the through-holes, respectively; a plurality of divided press casings into which a casing is divided in a vertical direction and in a lateral direction, the plurality of divided press casings surrounding a front surface, right and left side surfaces and upper and lower surfaces of the elastic member so as not to cover the through-holes; a first fastener member which tightens the plurality of divided press casings toward the cable guide; a second fastener member which tightens the plurality of divided press casings closer to each other in the vertical direction; and a third fastener member which tightens the plurality of divided press casings closer to each other in the lateral direction.

4 Claims, 6 Drawing Sheets

WATERPROOF CABLE GUIDE DEVICE FOR RAILWAY VEHICLE

CROSS-REFERENCE TO RELATED APPLICATION

This application claims priority to and the benefit of Japanese Patent Application No. 2010-035628 filed on Feb. 22, 2010, the entire disclosure of which is incorporated herein by reference.

BACKGROUND OF THE INVENTION

1. Field of the Invention

The present invention relates to a waterproof cable guide device mounted to a cable guide for a railway vehicle, which is provided with an introduction port through which a plurality of electric cables are guided into an electric device.

2. Description of the Related Art

Cable guides for a plurality of electric cables to an electric device, and device storage boxes storing the electric device are mounted mainly underfloor of a railcar. The cable guides and the device storage boxes are each provided with a cable guides having an introduction port through which the electric cables are inserted from outside to inside. The cable guides and the device storage boxes protect the electric cables to prevent water ingress into inside thereof. If a waterproof performance between the introduction port and the electric cables is insufficient, then water ingress from outside would occur.

In a conventional example, the plurality of electric cables are retained by upper and lower hard resin cable retaining members in locations spaced apart from each other, the cable retaining members are fastened by bolts penetrating vertically, and putty is coated to fill a gap between a hole of each cable retaining member and the corresponding electric cable. However, putty coating requires a high skill. If a worker is not skillful, the waterproof performance becomes insufficient and the water ingress would occur. Once the cable retaining members are disassembled to draw out the electric cables, old putty must be removed and then new putty must be coated when the cable retaining members are assembled again.

Japanese Unexamined Utility Model Application Publication No. Sho. 58-21297 discloses another conventional example of a waterproof cable guide device having a structure, in which a plurality of electric cables are inserted into rubber-made tubular bushings, respectively, the tubular bushings are retained by upper and lower hard resin cable retaining members and the cable retaining members are tightly fastened by bolts or the like. In this waterproof cable guide device, the waterproof performance is effectively attained regardless of whether or not the worker is skillful. In addition, after disassembling the waterproof cable guide device, the same components can be used to be re-assembled. However, in this waterproof cable guide device, it is necessary to insert each of the plurality of electric cables into the corresponding tubular bushing. For example, if terminals and the like are attached to the end portions of the electric cables, the electric cables must be inserted into the bushings, respectively, after the terminals and the like are removed. Such an operation is burdensome.

SUMMARY OF THE INVENTION

A waterproof cable guide device for railcars, of the present invention, which is mounted to a cable guide unit of a railcar which is provided with an introduction port through which a plurality of electric cables are guided into an electric device, the waterproof cable guide device comprising: an elastic member of a substantially rectangular prism shape, which has a plurality of through-holes into which the plurality of electric cables are inserted, respectively, the plurality of through-holes penetrating the elastic member in a forward and backward direction, the elastic member being divided in positions of the through-holes or having slits extending from an outer peripheral surface of the elastic member to the through-holes, respectively; a plurality of divided press casings into which a casing is divided in a vertical direction and in a lateral direction, the plurality of divided press casings surrounding a front surface, right and left side surfaces and upper and lower surfaces of the elastic member so as not to cover the through-holes; a first fastener member which tightens the plurality of divided press casings toward the cable guide to compress the elastic member toward the cable guide in a state where the electric cables are inserted into the through-holes, respectively; a second fastener member which tightens the plurality of divided press casings closer to each other in the vertical direction to compress the elastic member in the vertical direction, in a state where the electric cables are inserted into the through-holes, respectively; and a third fastener member which tightens the plurality of divided press casings closer to each other in the lateral direction to compress the elastic member in the lateral direction, in a state where the electric cables are inserted into the through-holes, respectively.

In accordance with the above configuration, by tightening the first to third fastener members, in a state where the electric cables are inserted into the through-holes of the elastic member and the divided press casings cover the elastic member, the elastic member is compressed in the forward and backward direction, in the vertical direction and in the lateral direction and closely contacts the electric cables. This makes it possible to surely and easily prevent ingress of water and dust into the electric device. The plurality of electric cables are inserted into the plurality of through-holes of the elastic member, respectively in such a manner that intermediate portions of the electric cables are brought into the through-holes through a space between divided components of the elastic member or through slits formed in the elastic member without inserting the end portions of the electric cables into the through-holes and moving the electric cables in an axial direction thereof. Thus, the work becomes easier. In addition, since it is not necessary to increase a distance between the through-holes of the elastic member, a space occupied by the cable guide and the waterproof cable guide device can be lessened, and size and weight of the cable guide and the waterproof cable guide device can be reduced. After assembling, the waterproof cable guide device can be disassembled by removing the fastener members, and thereafter can be assembled again. Thus, the waterproof cable guide device can be used in repetition.

DETAILED DESCRIPTION OF THE PREFERRED EMBODIMENTS

Hereinafter, an embodiment of the present invention will be described with reference to the drawings.

Figure 1:
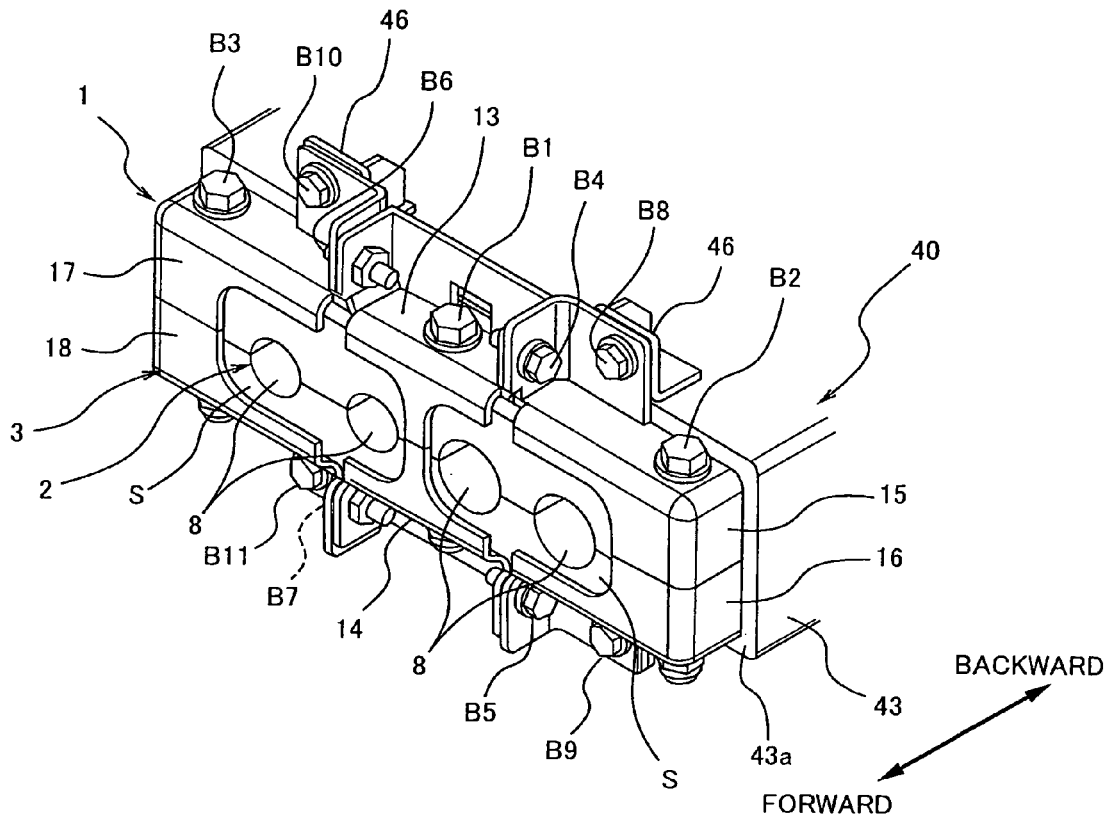
FIG. 1 is a perspective view showing a waterproof cable guide device according to an embodiment of the present invention.
Figure 2:
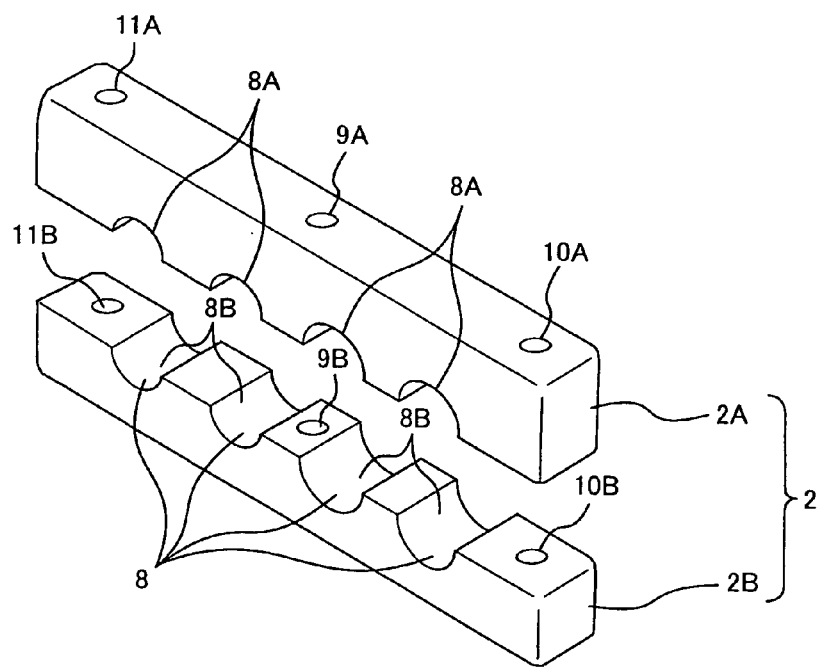
FIG. 2 is a perspective view of an elastic member of FIG. 1.
Figure 3:
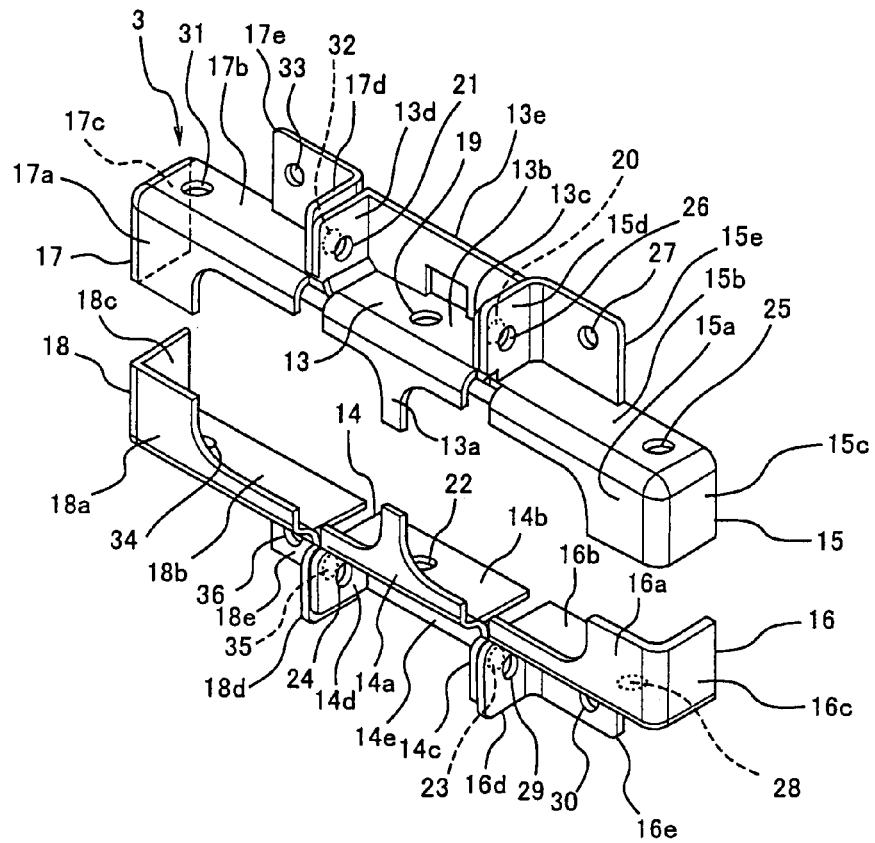
FIG. 3 is a perspective view of a divided press casing of FIG. 1.

FIG. 1 is a perspective view showing a waterproof cable guide device 1 according to an embodiment of the present invention. FIG. 2 is a perspective view of an elastic member 2 of FIG. 1. FIG. 3 is a perspective view of a divided press casing 3 of FIG. 1. As shown in FIGS. 1 to 3, the waterproof cable guide device 1 of this embodiment is mounted to a cable guide 43 of an electric device storage box 40 which is provided with an introduction port 45 (see FIG. 5) for guiding a plurality of electric cables 60 (see FIG. 5) for a railcar to an electric device. The waterproof cable guide device 1 includes the elastic member 2 made of a natural rubber or a synthetic rubber such as a chloroprene rubber, a divided press casing 3 made of metal, hard resin, or the like, first fastener members B8 to B11 for tightly fastening the divided press casing 3 to the cable guide 43, and second and third fastener members B1 to B7 for fastening casings of the divided press casing 3 together.

As shown in FIGS. 1 and 2, the elastic member 2 includes an upper elastic member 2A and a lower elastic member 2B which are upper and lower components into which the elastic member 2 is divided at vertical center positions of through-holes 8, and are vertically symmetric in shape. The elastic member 2 has a substantially rectangular prism shape which is elongate in a lateral direction. To be specific, the upper elastic member 2A has on a lower surface thereof grooves 8A having semi-circular cross-sections and being recessed in an upward direction, while the lower elastic member 2B has on an upper surface thereof grooves 8B having semi-circular cross-sections and being recessed in a downward direction. The grooves 8A and the grooves 8B are joined together, thereby forming the through-holes 8. The through-holes 8 penetrate the elastic member 2 in a forward and backward direction to allow the plurality of electric cables 60 (see FIG. 5) to be inserted therethrough, respectively, and have cross-sections of a perfect circle shape. In this embodiment, in the elastic member 2, the four through-holes 8 are aligned at equal intervals in the lateral direction.

Figure 4:
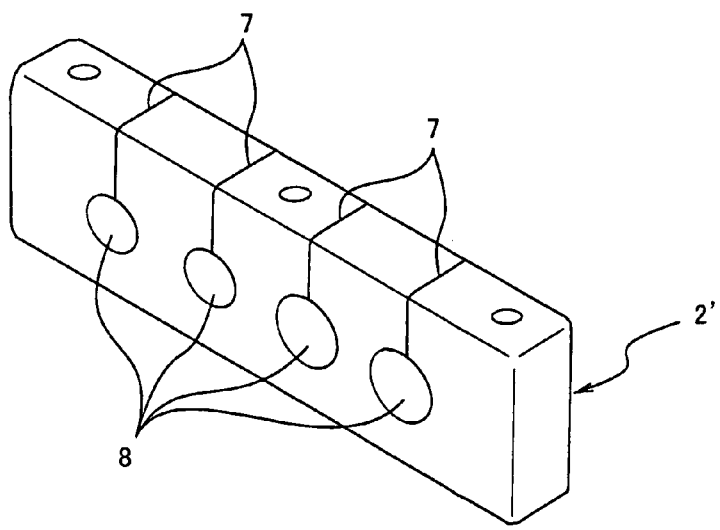
FIG. 4 is a perspective view of a modification example of the elastic member.

The elastic member 2 is provided with bolt holes 9A and 9B vertically penetrating a region between the two through-holes 8 at the center, among the four through-holes 8, and bolt holes 10A, 10B, 11A and 11B vertically penetrating regions outside the four through-holes 8 in a rightward and leftward direction. Instead of the elastic member 2 of FIG. 2, as shown in FIG. 4, an elastic member 2' provided with a plurality of slits 7 extending from an upper surface of an outer peripheral surface to the through-holes 8, respectively, may be used. In that case, the electric cables 60 (see FIG. 5) reach the through-holes 8 through the slits 7, respectively.

As shown in FIGS. 1 and 3, the divided press casing 3 includes upper and lower center casings 13 and 14, upper and lower right casings 15 and 16 disposed at the right side of the center casings 13 and 14, respectively, and upper and lower left casings 17 and 18 disposed at the left side of the center casings 13 and 14, respectively. Each of the casings 13 to 18 is formed by press-forming and suitably welding of a metal plate.

The upper center casing 13 and the lower center casing 14 are vertically symmetric. The upper center casing 13 includes a front wall 13a, an upper wall 13b, flange portions 13c and 13d protruding upward from right and left ends of the upper wall 13b, respectively, and a coupling portion 13e coupling rear ends of the right and left flange portions 13c and 13d to each other. The front wall 13a has a shape in which right and left lower portions are cut so as not to cover the through-holes 8 of the elastic member 2. The lower center casing 14 includes a front wall 14a, a lower wall 14b, flange portions 14c and 14d protruding downward from right and left ends of the lower wall 14b, and a coupling portion 14e coupling rear ends of the right and left flange portions 14c and 14d to each other. The front wall 14a has a shape in which right and left upper portions are cut so as not to cover the through-holes 8 of the elastic member 2.

The upper right casing 15 and the lower right casing 16 are vertically symmetric. The upper right casing 15 includes a front wall 15a, an upper wall 15b, a right side wall 15c, a flange portion 15d protruding upward from a left end of the upper wall 15b, and a flange portion 15e protruding upward from a left side of a rear end of the upper wall 15b and coupled to the flange portion 15d. The front wall 15a has a shape in which a left lower portion is cut so as not to cover the through-holes 8 of the elastic member 2. The lower right casing 16 includes a front wall 16a, a lower wall 16b, a right side wall 16c, a flange portion 16d protruding downward from a left end of the lower wall 16b, and a flange portion 16e protruding downward from a left end of a rear end of the lower wall 16b and coupled to the flange portion 16d. The front wall 16a has a shape in which a left upper portion is cut so as not to cover the through-holes 8 of the elastic member 2.

The upper left casing 17 and the lower left casing 18 are vertically symmetric. The upper left casing 17 includes a front wall 17a, an upper wall 17b, a left side wall 17c, a flange portion 17d protruding upward from a right end of the upper wall 17b, and a flange portion 17e protruding upward from a right side of a rear end of the upper wall 17b and coupled to the flange portion 17d. The front wall 17a has a shape in which a right lower portion is cut so as not to cover the through-holes 8 of the elastic member 2. The lower left casing 18 includes a front wall 18a, a lower wall 18b, a left side wall 18c, a flange portion 18d protruding downward from a right end of the lower wall 18b, and a flange portion 18e protruding downward from a right side of a rear end of the lower wall 18b and coupled to the flange portion 18d. The front wall 18a has a shape in which a right upper portion is cut so as not to cover the through-holes 8 of the elastic member 2.

The upper wall 13b of the center casing 13 has a bolt hole 19 vertically penetrating the upper wall 13b and communicating with a bolt hole 9A of the elastic member 2, while the lower wall 14b of the center casing 14 has a bolt hole 22 vertically penetrating the lower wall 14b and communicating with a bolt hole 9B of the elastic member 2. The upper wall 15b of the right casing 15 has a bolt hole 25 vertically penetrating the upper wall 15b and communicating with a bolt hole 10A of the elastic member 2, while the lower wall 16b of the right casing 16 has a bolt hole 28 vertically penetrating the lower wall 16b and communicating with a bolt hole 10B of the elastic member 2. The upper wall 17b of the left casing 17 has a bolt hole 31 vertically penetrating the upper wall 17b and communicating with a bolt hole 11A of the elastic member 2, while the lower wall 18b of the right casing 18 has a bolt hole 34 vertically penetrating the lower wall 18b and communicating with a bolt hole 11B of the elastic member 2.

The right flange portion 13c of the center casing 13 has a bolt hole 20 penetrating in the lateral direction, the right flange portion 14c of the center casing 14 has a bolt hole 23 penetrating in the lateral direction, the flange portion 15d of the right casing 15 has a bolt hole 26 penetrating in the lateral direction, and the flange portion 16d of the right casing 16 has a bolt hole 29 penetrating in the lateral direction such that the bolts 20 and 26 communicate with each other and the bolts 23 and 29 communicate with each other. The left flange portion 13d of the center casing 13 has a bolt hole 21 penetrating in the lateral direction, the left flange portion 14d of the center casing 14 has a bolt hole 24 penetrating in the lateral direction, the flange portion 17d of the left casing 17 has a bolt hole 32 penetrating in the lateral direction, and the flange portion 18d of the left casing 18 has a bolt hole 35 penetrating in the lateral direction such that the bolt holes 21 and 32 communicate with each other and the bolt holes 24 and 35 communicate with each other.

The flange portion 15e of the right casing 15, the flange portion 16e of the right casing 16, the flange portion 17e of the left casing 17 and the flange portion 18e of the left casing 18 are provided with bolt holes 27, 30, 33, and 36, respectively, penetrating in the forward and backward direction. Flange portions 46 are provided at front end portions of an upper surface of the cable guide 43 of the electric device storage box 40 to face the flange portion 15e of the right casing 15 and the flange portion 17e of the left casing 17, respectively, while flange portions 47 are provided at front end portions of a lower surface of the cable guide 43 of the electric device storage box 40 to face the flange portion 16e of the right casing 16 and the flange portion 18e of the left casing 18, respectively. The flange portions 46 of the cable guide 43 are provided with bolt holes 48 communicating with the bolt hole 27 of the casing 15 and the bolt hole 33 of the casing 17, while the flange portions 47 of the cable guide 43 are provided with bolt holes 49 communicating with the bolt hole 30 of the casing 16 and the bolt hole 36 of the casing 18.

The divided press casing 3 is caused to cover the elastic member 2 to surround a front surface, right and left side surfaces, and upper and lower surfaces of the elastic member 2. As described later, the first to third fastener members B1 to B11 (to be specific, bolts and nuts) are inserted into the corresponding bolt holes 9A, 9B, 10A, 10B, 11A, 11B, and 19 to 36. The front walls 13a, 14a, 15a, 16a, 17a, and 18a of the divided press casing 3 have openings S so as not to cover the through-holes 8 of the elastic member 2 in this state. The opening S is larger in size than the through-hole 8 of the elastic member 2.

In a state where the elastic member 2 is uncompressed before tightening the fastener members B1 to B11, the elastic member 2 protrudes in a backward direction relative to the divided press casing 3 in a state where the elastic member 2 is in contact with the front walls 13a, 14a, 15a, 16a, 17a, and 18a of the divided press casing 3. In a state where the elastic member 2 is uncompressed, lower ends of the upper casings 13, 15 and 17 are apart from upper ends of the lower casings 14, 16, and 18, respectively. In a state where the elastic member 2 is uncompressed, the flange portion 15e of the right casing 15 and the flange portion 17e of the left casing 17 are apart from the flange portions 46 of the cable guide 43, respectively, and the flange portion 16e of the right casing 16 and the flange portion 18e of the left casing 18 are apart from the flange portions 47 of the cable guide 43, respectively. In a state where the elastic member 2 is uncompressed, the flange portion 13c of the casing 13, the flange portion 13d of the center casing 13, the flange portion 14c of the center casing 14 and the flange portion 14d of the center casing 14 are apart from the flange portion 15d of the right casing 15, the flange portion 17d of the left casing 17, the flange portion 16d of the right casing 16 and the flange portion 18d of the left casing 18, respectively.

Figure 5:
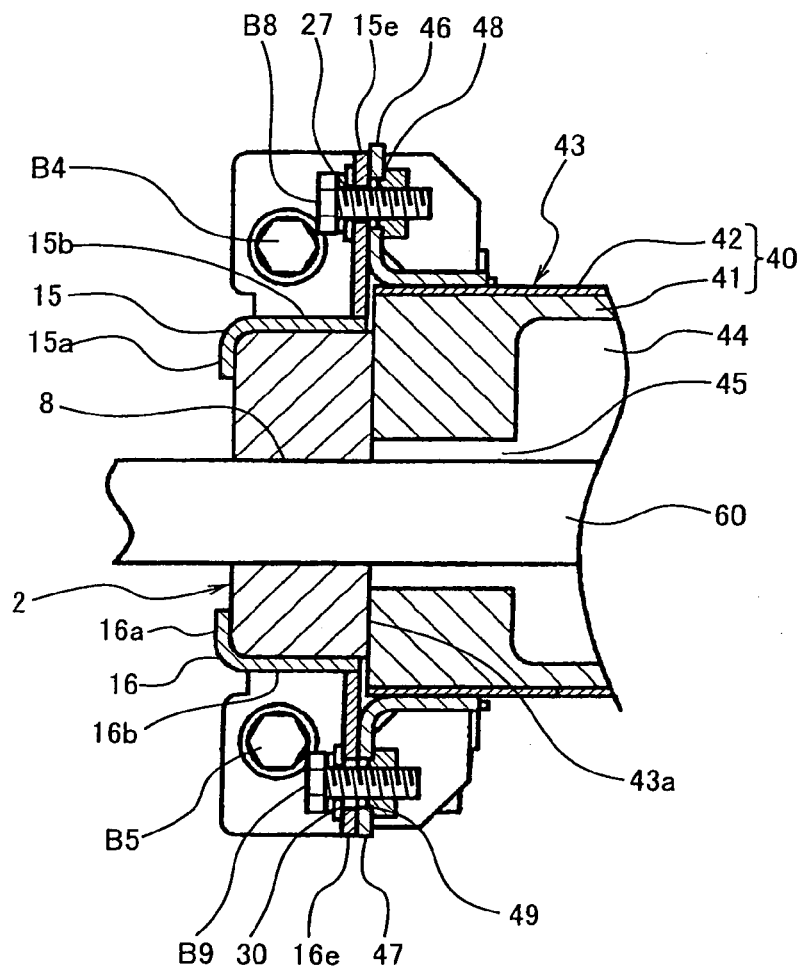
FIG. 5 is a cross-sectional view showing a state where the waterproof cable guide device of FIG. 1 is mounted to an electric device storage box.
Figure 6A:
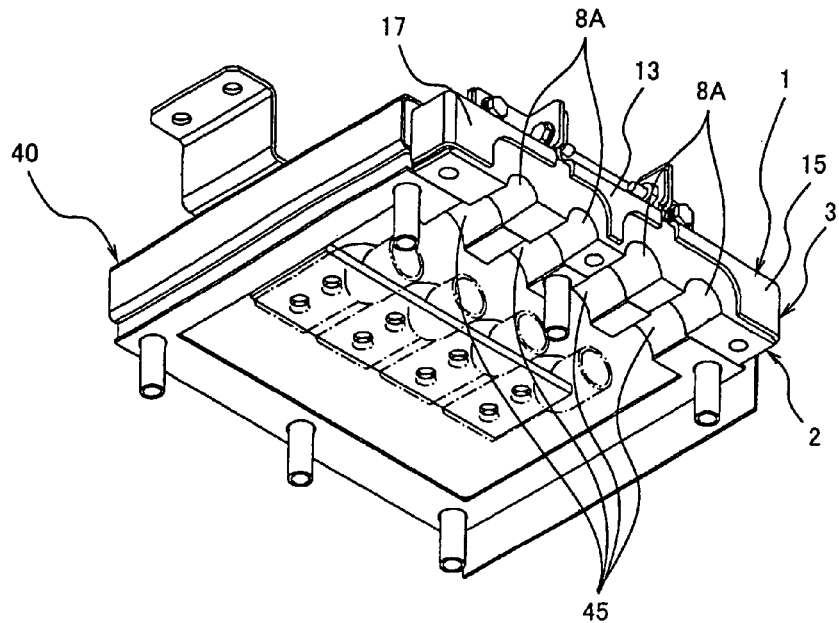
FIG. 6A is a perspective view showing a state where a lower half part of the waterproof cable guide device and a lower half part of the electric device storage box are removed.
Figure 6B:
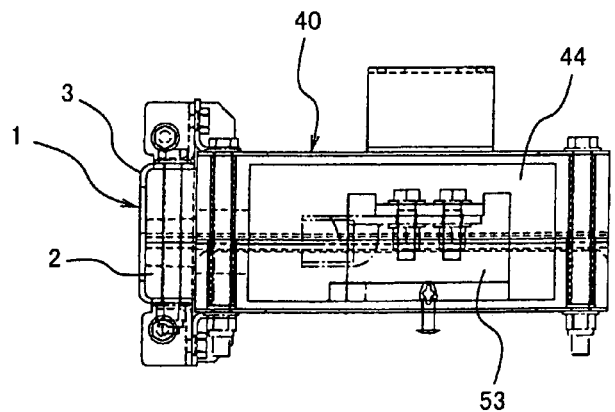
FIG. 6B is a side view of the waterproof cable guide device and the electric device storage box of FIG. 1.
Figure 6C:
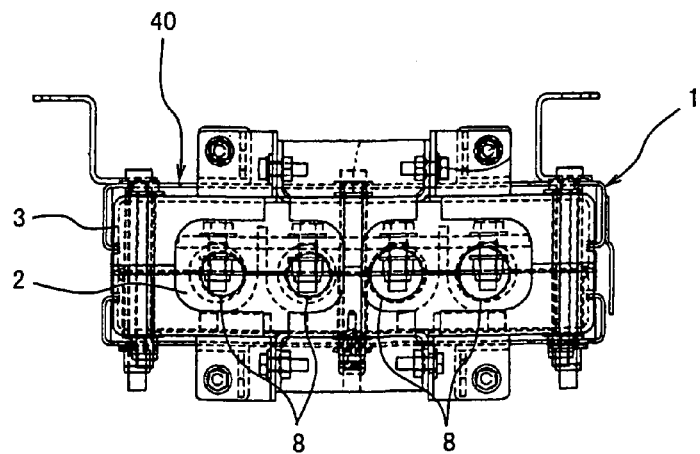
FIG. 6C is a front view of the waterproof cable guide device and the electric device storage box of FIG. 6B.
Figure 7:
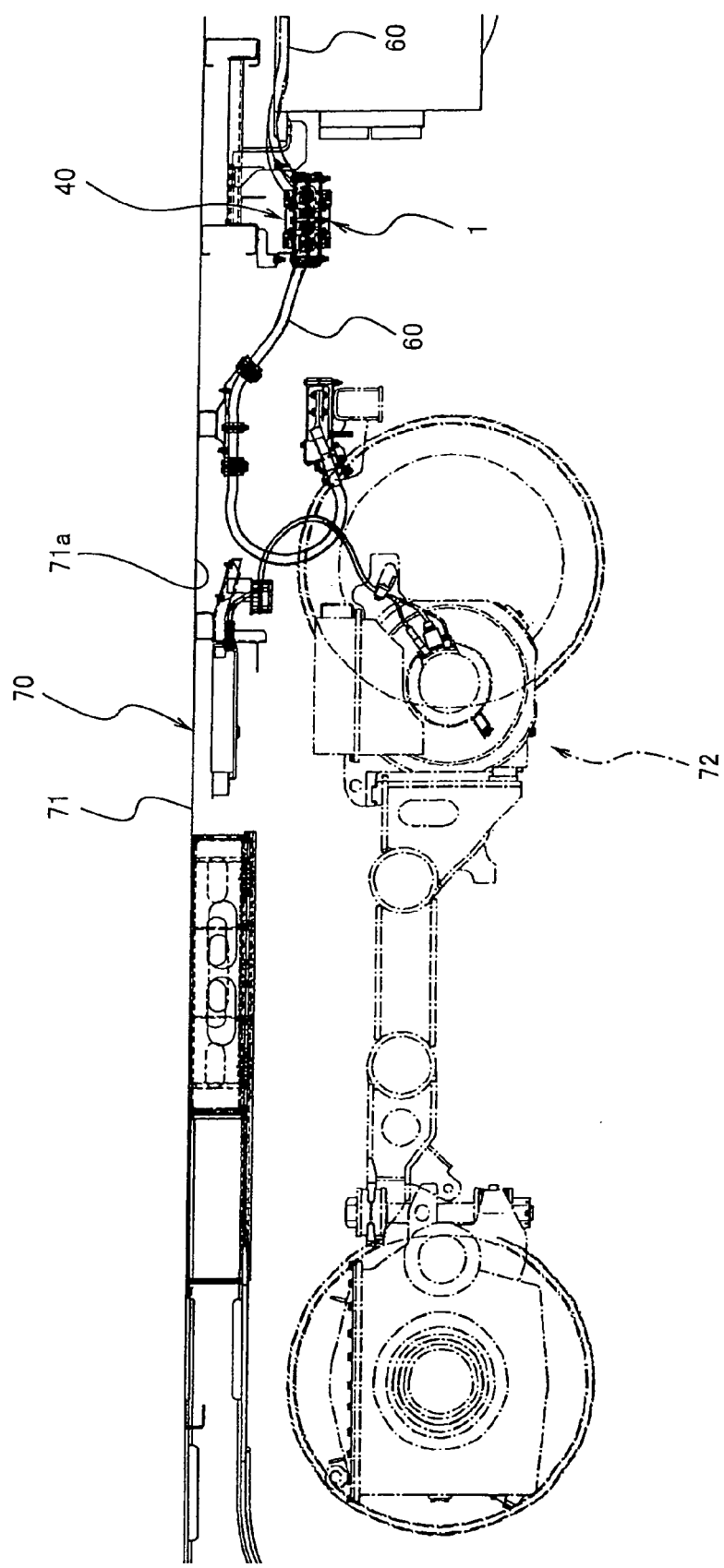
FIG. 7 is a side view of major components of a railcar attached with the waterproof cable guide device of FIG. 1.
Figure 8:
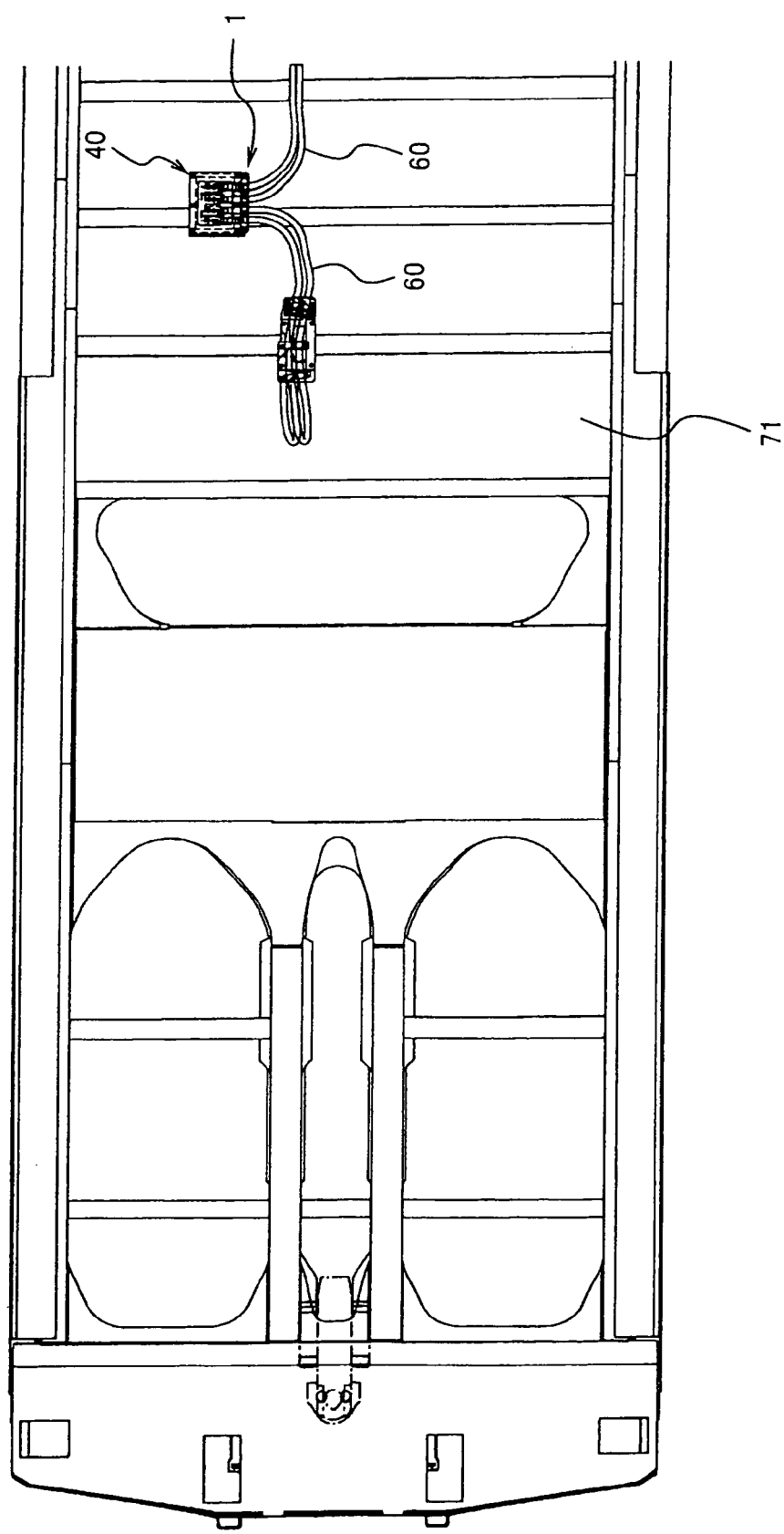
FIG. 8 is a bottom view of a railcar of FIG. 7.

FIG. 5 is a cross-sectional view showing a state where the waterproof cable guide device 1 of FIG. 1 is mounted to the electric device storage box 40. FIG. 6A is a perspective view showing a state where a lower half part of the waterproof cable guide device 1 and a lower half part of the electric device storage box 40 are removed. FIG. 6B is a side view of the waterproof cable guide device 1 and the electric device storage box 40 of FIG. 1. FIG. 6C is a front view of the waterproof cable guide device 1 and the electric device storage box 40 of FIG. 6B. FIG. 7 is a side view of major components of a railcar 70 attached with the waterproof cable guide device 1 of FIG. 1. FIG. 8 is a bottom view of the railcar 70 of FIG. 7. As shown in FIGS. 5 to 8, the electric device storage box 40 of the railcar 70 is fastened to a lower surface of a floor 71a of a carbody 71 in the vicinity of a truck 72, and an electric device 53 is accommodated into an inner space 44 of the electric device storage box 40. The electric device storage box 40 includes an inner wall 41 made of hard resin and an outer wall 42 fastened to an outer surface of the inner wall 41 and formed of a metal plate. The cable guide 43 at a front portion of the electric device storage box 40 is provided on a flat front surface 43a with an introduction port 45 through which the four electric cables 60 are guided to the electric device 53. The flange portions 46 having a L-shaped cross-section are welded and fixed to the upper surface of the outer wall 42, while the flange portions 47 having a L-shaped cross-section are welded and fixed to the lower surface of the outer wall 42.

Next, an work for mounting the waterproof cable guide device 1 will be described mainly with reference to FIGS. 1 to 3 and 5. Initially, in the cable guide 43 of the electric device storage box 40, the four electric cables 60 are drawn into the inner space 44 through the introduction port 45 such that the four electric cables 60 are spaced apart from each other. In this state, the four electric cables 60 are sandwiched between the grooves 8A of the upper elastic member 2A and the grooves 8B of the lower elastic member 2B, thereby allowing the electric cables 60 to be inserted into the through-holes 8 of the elastic member 2.

Then, the divided press casing 3 is moved to cover the elastic member 2, and the second fastener members B1 to B3 are vertically inserted into the corresponding bolt holes 19, 22, 25, 28, 31 and 34 extending in the vertical direction in the casings 13 to 18 and into the corresponding bolt holes 9A, 9B, 10A, 10B, 11A, and 11B of the elastic member 2, respectively, and are temporarily fastened together. Thus, the divided press casing 3 is positioned with respect to the elastic member 2. Then, the third fastener members B4 to B7 are inserted in the lateral direction into the corresponding bolt holes 20, 21, 23, 24, 26, 29, 32, and 35 extending in the lateral direction in the casings 13 to 18, respectively, and are temporarily fastened together. Then, the first fastener members B8 to B11 are inserted in the forward and backward direction into the corresponding bolt holes 27, 30, 33, and 36 extending in the forward and backward direction in the casings 13 to 18, and into the corresponding bolt holes 48 and 49 in the cable guide 43, and are temporarily fastened together.

In this temporarily fastened state, the casings 13 to 18 are tightened toward the cable guide 43, by the first fastener members B8 to B11. As a result, the elastic member 2 is compressed toward the cable guide 43 and is brought into close contact with the front surface 43a of the cable guide 43. By the second fastener members B1 to B3, the casings 13 to 18 are tightened together in the vertical direction to get closer to each other. By the third fastener members B4 to B7, the right casings 15 and 16 and the left casings 17 and 18 are tightened to get closer to the center casings 13 and 14. Thereby, the elastic member 2 is compressed in the vertical direction and in the lateral direction, and the through-holes 8 are deformed to reduce their diameters, thereby allowing the elastic member 2 to closely contact an outer peripheral surface of the electric cables 60. In the manner as described above, the waterproof cable guide device 1 is fastened to the electric device storage box 40, the elastic member 2 is compressed in a thickness direction and closely contacts the front surface 43a of the cable guide 43, and the elastic member 2 is compressed in the vertical direction and in a rightward and leftward direction and closely contacts the electric cables 60.

In accordance with the above configuration, by tightening the first to third fastener members B1 to B11, in a state where the electric cables 60 are inserted into the through-holes 8 of the elastic member 2 and the divided press casing 3 covers the elastic member 2, the elastic member 2 is compressed in the forward and backward direction, in the vertical direction and in the lateral direction and closely contacts the electric cables 60. This makes it possible to surely and easily prevent ingress of water and dust into the electric device 53. The plurality of electric cables 60 are inserted into the plurality of through-holes 8 of the elastic member 2, respectively in such a manner that intermediate portions of the electric cables 60 are brought into the through-holes 8 through a space between divided components of the elastic member 2 without inserting the end portions of the electric cables 60 into the through-holes 8 and moving the electric cables 60 in an axial direction thereof. Thus, the work becomes easier. In addition, since it is not necessary to increase a distance between the through-holes 8 of the elastic member 2, a space occupied by the cable guide 43 and the waterproof cable guide device 1 can be lessened, and size and weight of the cable guide 43 and the waterproof cable guide device 1 can be reduced. After assembling, the waterproof cable guide device 1 can be disassembled by removing the fastener members B1 to B11, and thereafter can be assembled again. Thus, the waterproof cable guide device 1 can be used in repetition.

The number of the through-holes and the number of bolt holes which are provided in the elastic member 2 are determined according to the number of the electric cables 60, and are not limited to four. The number of divided components of the divided press casing 3 is not limited particularly so long the divided press casing 3 has two or more divided components in each of the vertical direction and the lateral direction.

What is claimed is:

1. A waterproof cable guide device for a railway vehicle, which is mounted to a cable guide of railcars which is provided with an introduction port through which a plurality of electric cables are guided to an electric device, the waterproof cable guide device comprising:
   an elastic member of a substantially rectangular prism shape, which has a plurality of through-holes into which the plurality of electric cables are inserted, respectively, the plurality of through-holes penetrating the elastic member in a forward and backward direction, the elastic member being divided in positions of the through-holes or having slits extending from an outer peripheral surface of the elastic member to the through-holes, respectively;
   a plurality of divided press casings into which a casing is divided in a vertical direction and in a lateral direction, the plurality of divided press casings surrounding a front surface, right and left side surfaces and upper and lower surfaces of the elastic member so as not to cover the through-holes;
   a first fastener member which tightens the plurality of divided press casings toward the cable guide to compress the elastic member toward the cable guide in a state where the electric cables are inserted into the through-holes, respectively;
   a second fastener member which tightens the plurality of divided press casings closer to each other in the vertical direction to compress the elastic member in the vertical direction, in a state where the electric cables are inserted into the through-holes, respectively; and
   a third fastener member which tightens the plurality of divided press casings closer to each other in the lateral direction to compress the elastic member in the lateral direction, in a state where the electric cables are inserted into the through-holes, respectively.

2. The waterproof cable guide device for the railway vehicle, according to claim 1,
   wherein the elastic member protrudes from the plurality of divided press casings toward the cable guide, in a state where the elastic member is covered with the plurality of divided press casings and is uncompressed.

3. The waterproof cable guide device for the railway vehicle, according to claim 1,
   the elastic member have the plurality of through-holes which are aligned in the lateral direction and have an outer shape elongate in the lateral direction;
   the divided press casings include upper and lower center casings, upper and lower right casings disposed at a right side of the center casings, respectively, and upper and lower left casings disposed at a left side of the center casings, respectively; and
   the second fastener members are attached to the center casings, the right casings, and the left casings, respectively, and tighten the casings closer to each other in the vertical direction.

4. The waterproof cable guide device for the railway vehicle, according to claim 1,
   the center casings are provided with flange portions disposed at both end portions thereof in the lateral direction and protruding in an upward direction and in a downward direction, respectively;
   the right casings are provided with flange portions disposed at their end portions at the center casing side, respectively, and the left casings are provided with flange portions disposed at their end portions at the center casing side, respectively; and
   the third fastener members tighten the flange portions of the right casings closer to the flange portions of the center casings, respectively, and tighten the flange portions of the left casings closer to the flange portions of the center casings, respectively.

* * * * *